(12) United States Patent
Freire-Diaz et al.

(10) Patent No.: US 7,905,720 B2
(45) Date of Patent: Mar. 15, 2011

(54) LINEAR TYPE MOLDING UNIT FOR A CONTAINER MANUFACTURING INSTALLATION

(75) Inventors: Philippe Freire-Diaz, Octeville-sur-Mer (FR); Sylvain Auvray, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 563 days.

(21) Appl. No.: 12/066,164

(22) PCT Filed: Sep. 8, 2006

(86) PCT No.: PCT/FR2006/002073
§ 371 (c)(1),
(2), (4) Date: Mar. 7, 2008

(87) PCT Pub. No.: WO2007/028909
PCT Pub. Date: Mar. 15, 2007

(65) Prior Publication Data
US 2008/0260888 A1    Oct. 23, 2008

(30) Foreign Application Priority Data
Sep. 9, 2005    (FR) ...................................... 05 09189

(51) Int. Cl.
*B29C 49/56*    (2006.01)
(52) U.S. Cl. ...................... 425/541; 425/451.4; 425/529

(58) Field of Classification Search .................. 425/529, 425/541, 451.4, DIG. 5
See application file for complete search history.

(56) References Cited

U.S. PATENT DOCUMENTS

| 2,269,553 | A | * | 1/1942 | Roessler ........................ 425/541 |
| 3,883,286 | A | | 5/1975 | Kinslow, Jr. et al. |
| 4,141,680 | A | * | 2/1979 | Kauffman et al. ............ 425/529 |
| 4,352,653 | A | | 10/1982 | Ott et al. |
| 2004/0156943 | A1 | | 8/2004 | Lefebure |

FOREIGN PATENT DOCUMENTS

| EP | 0 703 058 A2 | 3/1996 |
| EP | 1 533 103 A1 | 5/2005 |
| GB | 1 602 221 A | 11/1981 |
| JP | 62-178319 A | 8/1987 |

* cited by examiner

*Primary Examiner* — Robert B Davis
(74) *Attorney, Agent, or Firm* — Sughrue Mion, PLLC

(57) ABSTRACT

The invention concerns a unit (6) for molding containers (2), comprising: a pair of half-molds (9), mounted respectively on two supports (10) mobile in horizontal translation; a primary transmission (19) controlling the movement of the supports (10); a mold base (14) mounted on a support (15) mobile in vertical translation; a secondary transmission controlling the movement of the mold base support (15); a locking device (16), comprising two mobile locks (17) co-operating each with a half-mold support (10); a tertiary transmission (21) controlling the movement of the locks (17). The transmissions include cams mounted on a common shaft, respectively coupled to the half-mold supports, to the mold base support and to the locks.

8 Claims, 7 Drawing Sheets

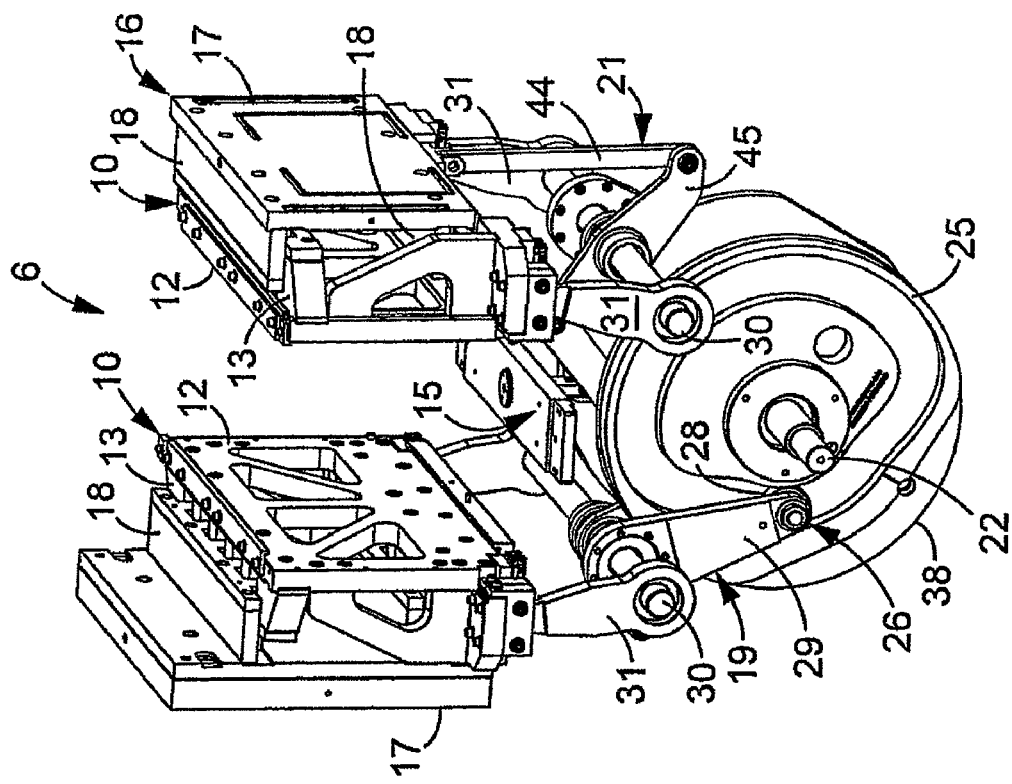
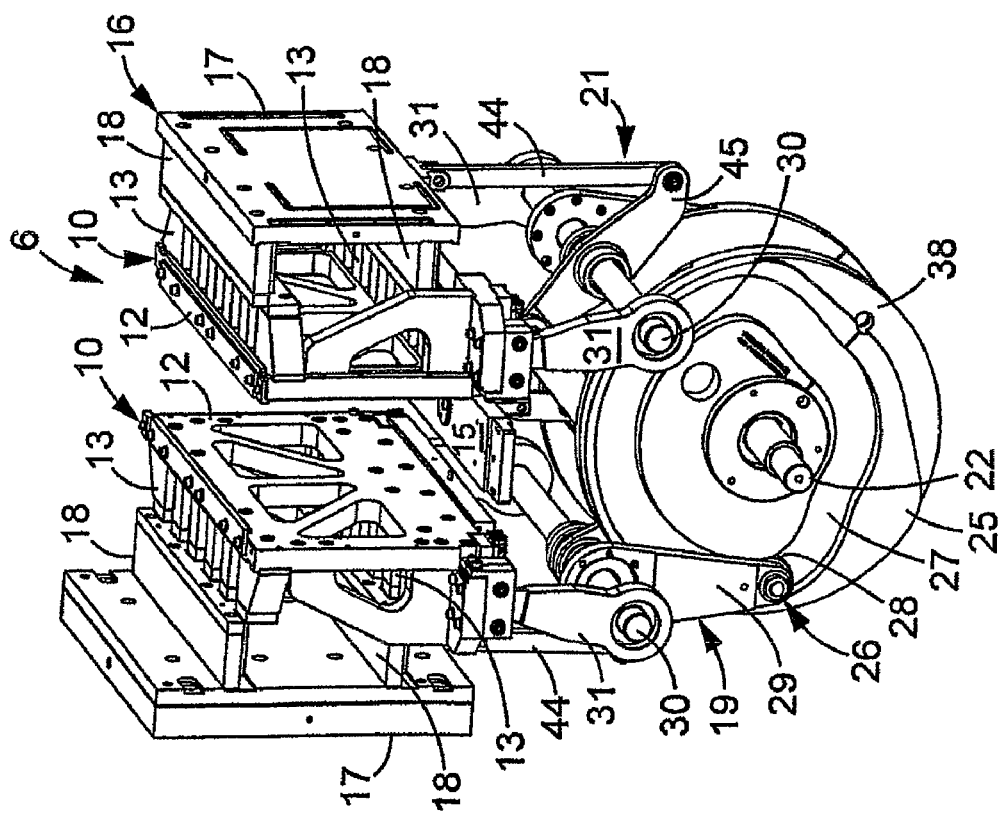
FIG. 4A
FIG. 4B

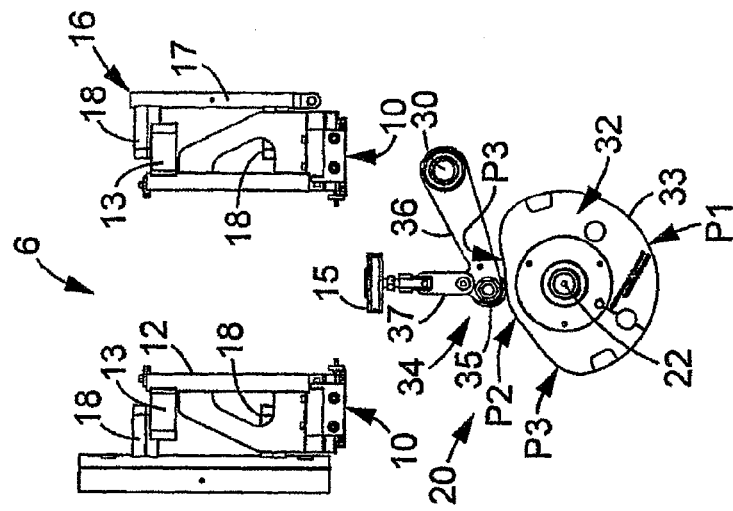
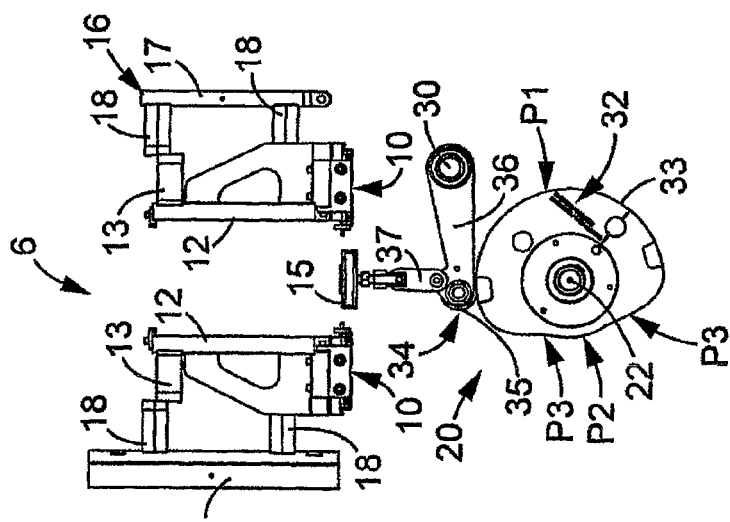
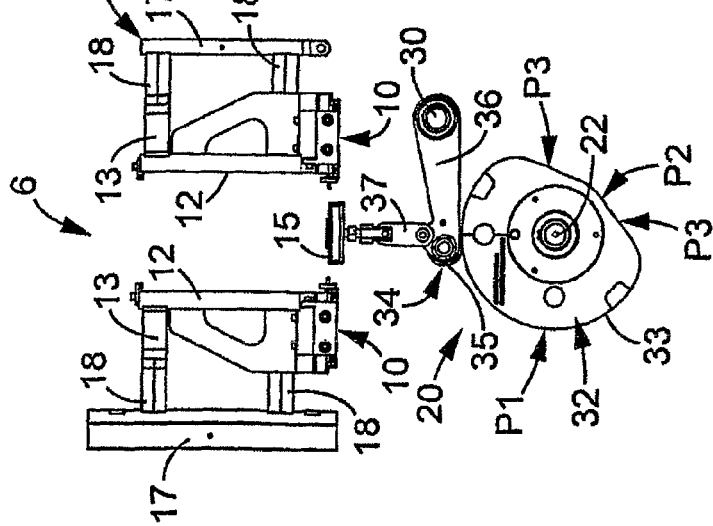

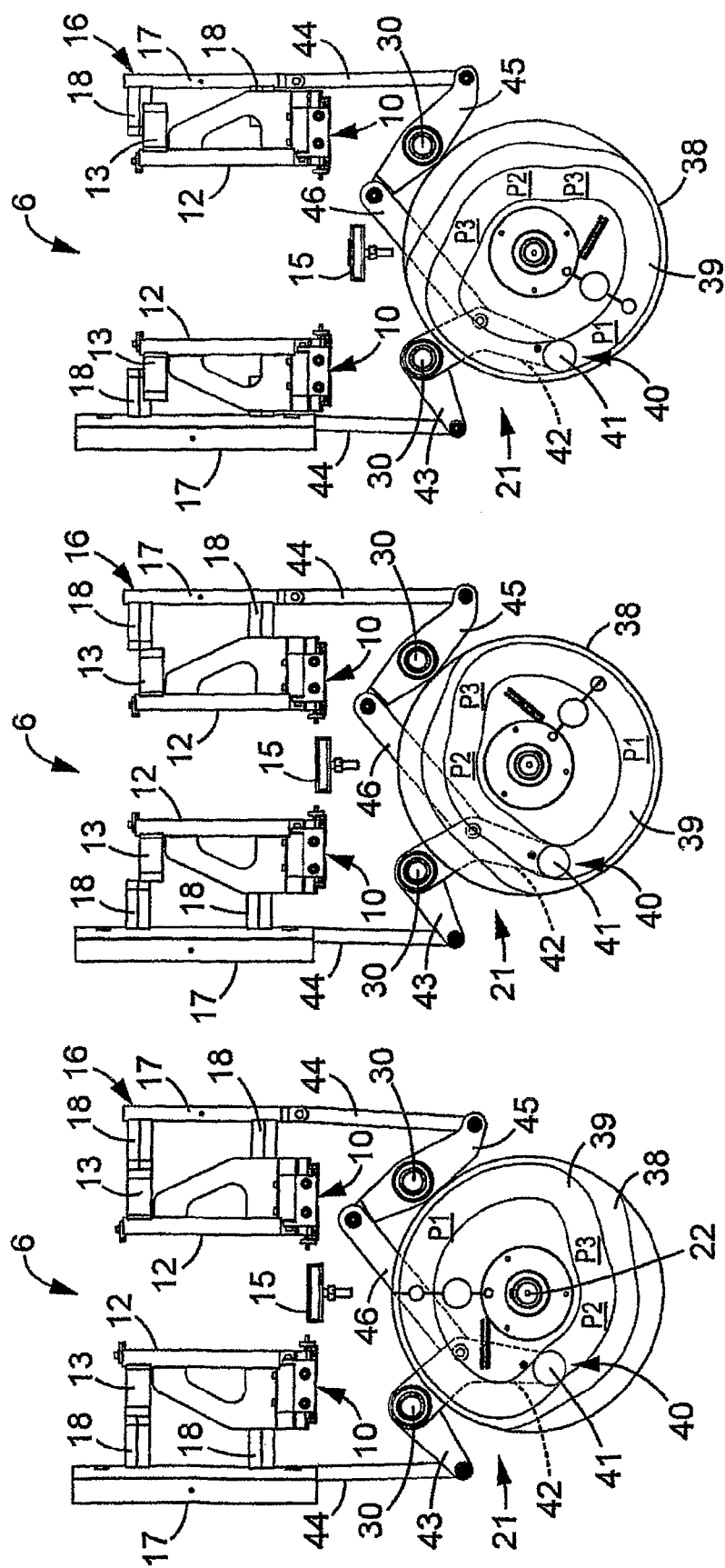

LINEAR TYPE MOLDING UNIT FOR A CONTAINER MANUFACTURING INSTALLATION

The invention relates to the manufacture of containers.

It relates more particularly to a molding unit for an installation for blow-molding or stretch-blow-molding containers. In such an installation, blanks (generally produced in a thermoplastic material such as PET) are firstly heated in succession in an oven at a temperature which is lower than (but close to) their glass transition temperature, then transferred to a molding unit where they are molded by blow-molding or stretch-blow-molding.

Currently, there are two large groups of molding units. The first group, which corresponds to high production rates (greater than 10,000 containers/hour), contains rotating machines in which a carrousel carries a plurality of molds distributed over its circumference, each mold comprising two half-molds mounted in rotation relative to one another along an axis parallel to the axis of the container, where the containers are successively molded individually. To illustrate this technique, reference may be made to the patent application published under the number FR 2 793 722, in the name of the applicant.

The second group, which corresponds to lower production rates (less than 10,000 containers/hour), contains so-called linear machines in which a mold comprises two half-molds which may be displaced in translation relative to one another, perpendicularly to the joint plane of the mold. In this group, the production rates may be increased by providing a multi-cavity mold for molding a plurality of containers simultaneously.

The invention relates to this second group of molding units. More specifically, a transfer device is generally interposed between the oven and the molding unit for removing the blanks leaving the oven in groups and introducing them into the molding unit by controlling their center-to-center distance. As the present invention relates neither to the heating nor the transfer of the blanks, these questions will not be discussed in more detail below.

A first problem with which manufacturers are presented in the linear technique relates to the opening and closing of the half-molds. More specifically, these half-molds (especially when they comprise a plurality of cavities) are relatively heavy; the opening and the closing of the half-molds has to be carried out in a fraction of a second (in the order of 0.5 seconds). The opening/closing mechanism, therefore, has to be sufficiently powerful and the friction minimal.

A second problem concerns the locking of the half-molds in the closed position (the position in which the blow-molding of the containers takes place). More specifically, during blow-molding the half-molds are subjected to significant separation forces, due to the blow-molding pressure which may reach 40 bar.

Among the known technical solutions, French patent application published under the number FR 2 790 702, also in the name of the applicant, may be cited by way of example. In addition to this application, a plurality of patents for the linear technique have been filed by other companies. The European patent application published under the number EP 0 703 058 (A.K. Technical Laboratory) may be cited by way of example. In this document, the displacement of the mobile parts from the molding unit (in particular the half-molds) is ensured by jacks. This technique requires considerable hydraulic power, taking into account the masses to be moved. An alternative technique consists in replacing the jacks by linear motors (cf. EP 1 533 103 (KOSME)) or by endless screw systems (see for example the aforementioned SIDEL patent No. FR 2 790 702). This technique may produce significant torques provided by the electric motors without having recourse to the aforementioned hydraulic powers, but the slowness of the helicoidal endless screw system limits the production rates. As regards the linear motors, it is necessary to ensure their perfect synchronization, which appears to be relatively awkward.

Finally, the known techniques prove to be insufficient for satisfactorily overcoming the problems that have been outlined above, and for increasing the production rates in complete safety.

The invention aims, in particular, to remedy specific drawbacks of the known techniques, which are mentioned above.

To this end, the invention proposes a molding unit for an installation for blow-molding or stretch-blow-molding containers from blanks made of thermoplastic material, which comprises:

- a pair of half-molds, each provided with at least one mold half-cavity, respectively mounted on two supports which are mobile in horizontal translation in a transverse direction perpendicular to a longitudinal direction for supplying the blanks, between a closed position in which the supports are brought together and where the half-cavities jointly form a lateral wall of the mold cavity and an open position in which the supports are separated from one another;
- a primary transmission controlling the displacement of the half-mold supports and comprising a primary cam mounted on a rotating shaft driven by a motor, in addition to a primary cam follower cooperating with the primary cam and coupled to each half-mold support;
- a mold base mounted on a support which is mobile in vertical translation in a direction perpendicular to the longitudinal and transverse directions, between an upper position in which an upper surface of the mold base completes the mold cavity in the closed position of the supports and a lower position spaced apart from the upper position, below said position;
- a secondary transmission controlling the displacement of the mold base support and comprising a secondary cam mounted on the same rotating shaft, in addition to a secondary cam follower cooperating with the secondary cam and coupled to the mold base support;
- a locking device which comprises two locks, each cooperating with a half-mold support, mobile in translation between a locked position in which the locks lock the half-mold supports in the closed position, and a released position in which the locks permit the passage of the half-mold supports into the open position; and
- a tertiary transmission controlling the displacement of the locks and comprising a tertiary cam mounted on the same rotating shaft, in addition to a tertiary cam follower cooperating with the tertiary cam and coupled to each lock.

In this manner, the mechanism for controlling the movements of the parts of the molding unit, of the "all mechanical" type, increases both the reliability and the longevity thereof. Moreover, the synchronization between the different transmissions results directly from the profile of the cams and the mounting thereof on a single transmission shaft.

Further objects and advantages of the invention will become apparent from reading the following description with reference to the accompanying drawings, in which:

FIGS. 4A and 4B are views similar to FIG. 2, respectively configured in a closed/unlocked position and open/unlocked position;

FIGS. 6A, 6B and 6C are front elevations showing the molding unit limited to the secondary transmission in the same positions as in FIGS. 5A, 5B and 5C respectively; and FIGS. 7A, 7B and 7C are sectional elevations showing the molding unit limited to the tertiary transmission, in the same positions as in FIGS. 5A, 5B and 5C respectively.

Figure 1:
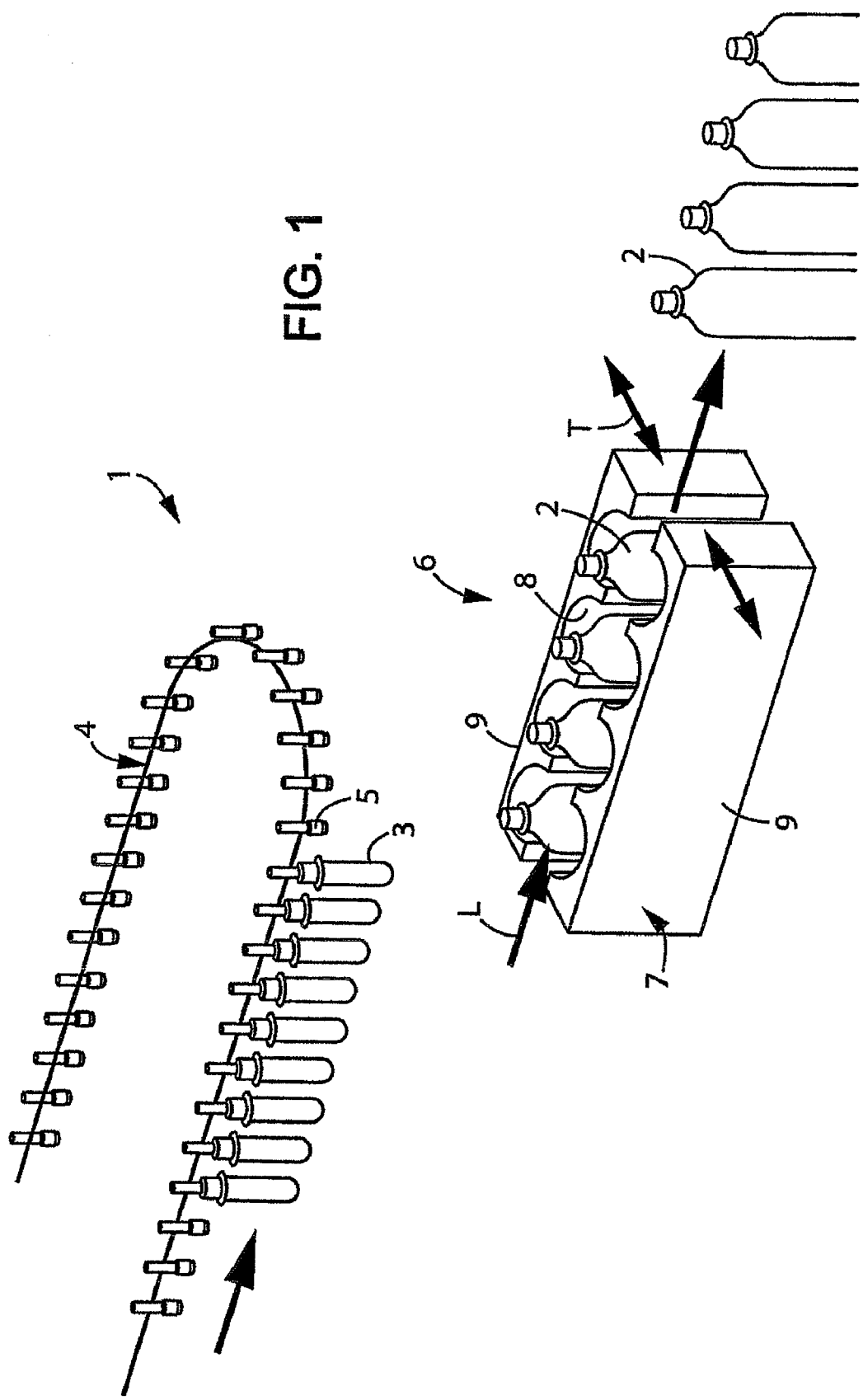
FIG. 1 is a schematic perspective view showing (partially) an installation for manufacturing containers from blanks.

Shown schematically in FIG. 1—and partially—is an installation 1 for molding containers 2 from blanks 3 (which are in this case preforms) made of thermoplastic material, such as PET (polyethylene terephthalate).

Said installation 1 comprises a carrousel 4 on which the preforms 3 are mounted, suspended on turntables 5 which drive said preforms in rotation, at least when they reach an oven (or heating unit) where they are heated in succession by, for example, being exposed to infrared radiation from tubular lamps (not shown).

As is shown in FIG. 1, the machine 1 also comprises a molding unit 6 equipped with a mold 7 with a plurality of molds or cavities 8 (in this case four), into which the hot blanks 3 are discharged after having been transferred from the heating station by means of an appropriate transfer device (not shown).

The direction in which the preforms 3 are supplied to the molding unit 6 is conventionally known as longitudinal and denoted as L.

The mold 7 comprises two half-molds 9, each provided with at least one mold half-cavity (in this case four) and respectively mounted on two supports 10 mobile in horizontal translation on a fixed frame 11 of the molding unit 6 in a transverse direction T perpendicular to the longitudinal direction L for supplying the preforms 3 between:

a closed position in which the supports 10 are brought together, the half-molds 9 being in mutual contact and the half-cavities jointly forming a lateral wall of the mold cavity 8 (cf. FIGS. 5A and 5B); and an open position in which the supports 10 (and thus the half-molds 9) are separated from one another to permit the removal of the molded container 2 (cf. FIG. 5C), then the introduction of at least one preform 3 between the half-molds 9.

More specifically, each half-mold 9 is in the form of a separate monobloc part, attached to a plate 12 of the corresponding support 10, oriented in a vertical plane parallel to the longitudinal direction L.

Figure 2:
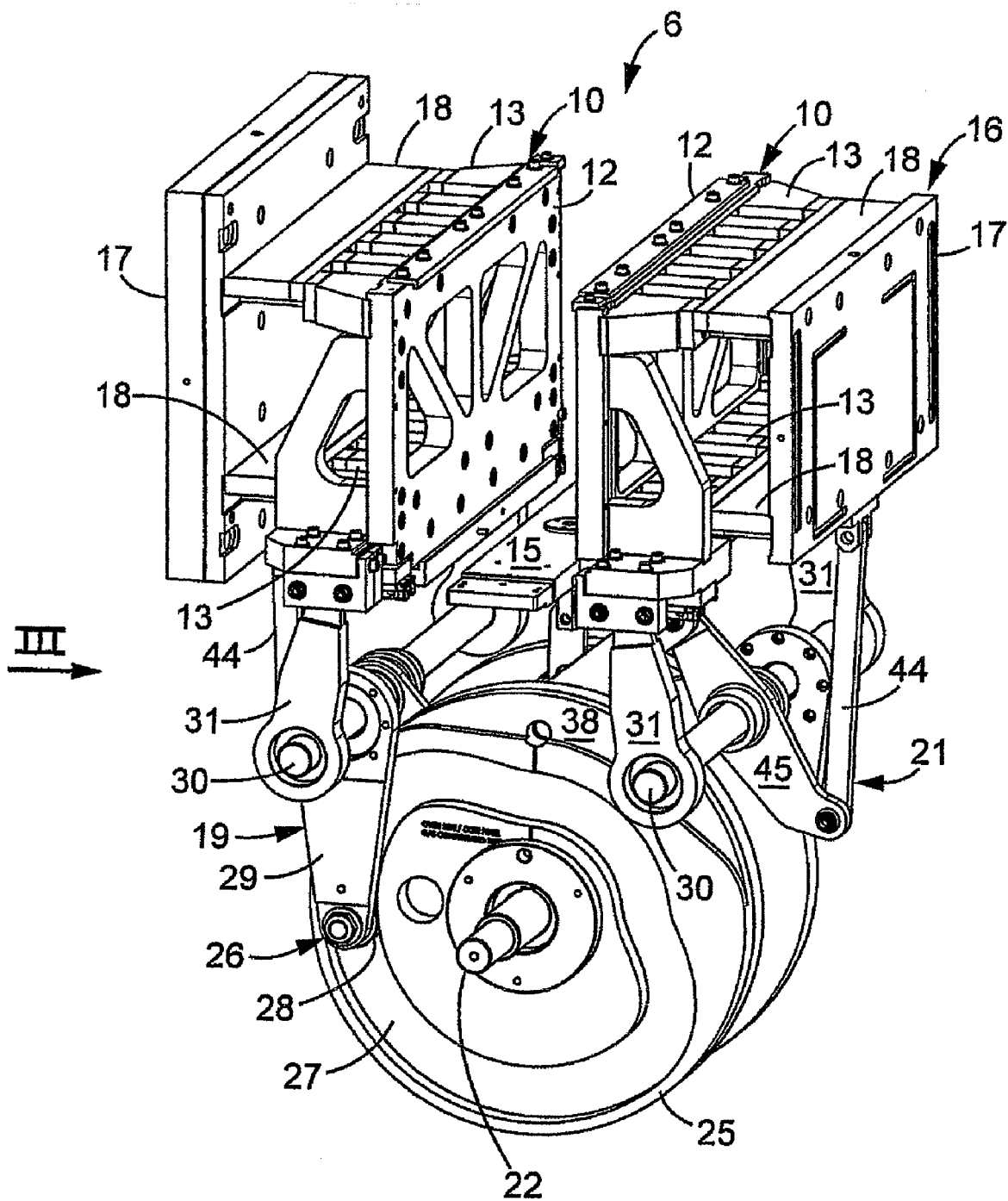
FIG. 2 is a perspective view showing partially a molding unit according to the invention, for a container manufacturing installation; in this figure, the molding unit is shown in a closed/locked configuration.
Figure 3:
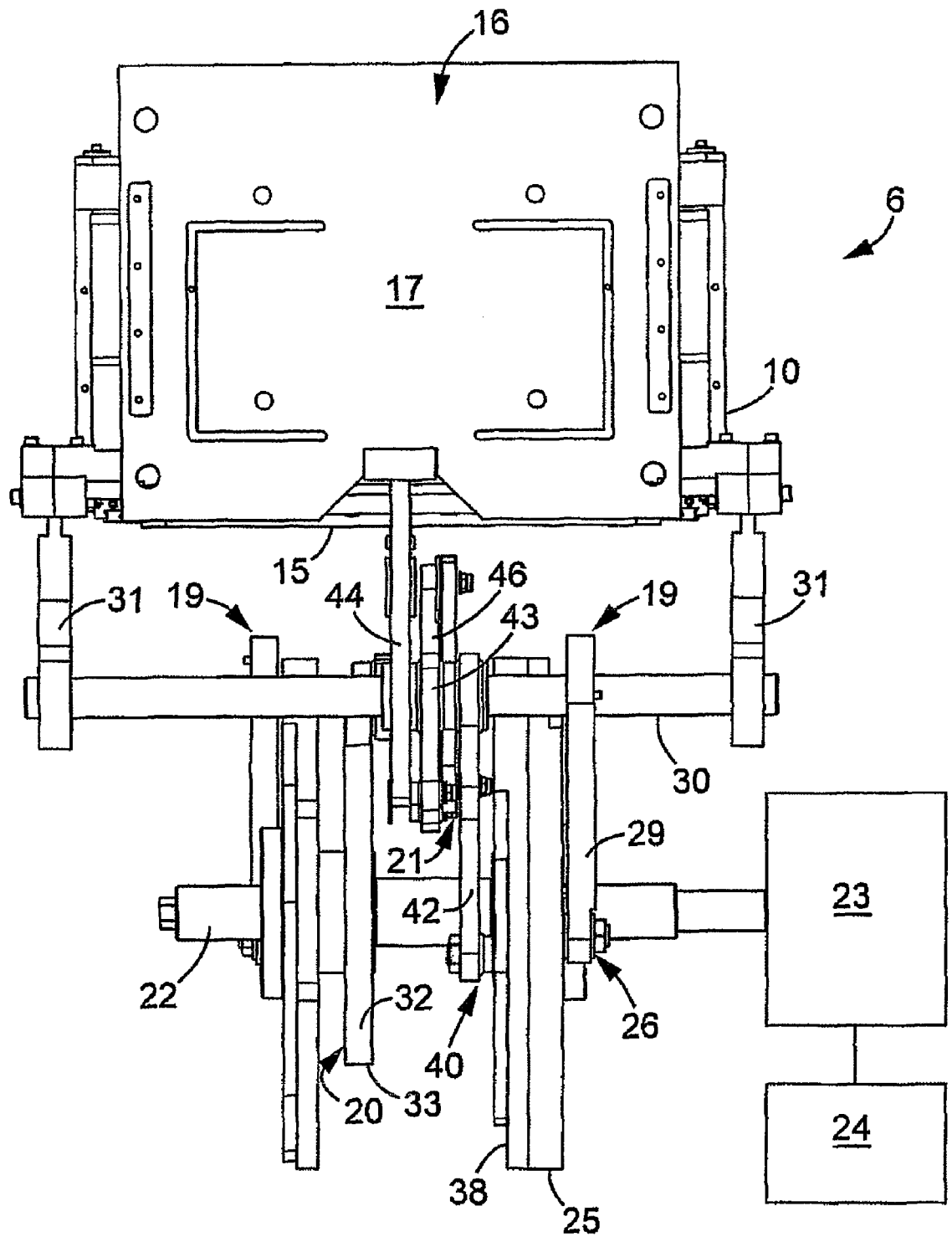
FIG. 3 is a side elevation showing the molding unit of FIG. 2 according to the direction III.

As is visible in FIGS. 2, 4A and 4B, each support 10 is provided with a pair of superposed grooved runners 13 which project transversely, protruding beyond the plate 12 opposite the corresponding half-mold 9.

The mold 7 also comprises a mold base 14 which has an upper surface complementary to the base of the container 2 to be molded, and mounted on a support 15 which is mobile in vertical translation in a direction perpendicular to the longitudinal and transverse directions, between:

an upper position in which the upper surface of the base of the mold 14 completes the mold cavity 8 in the closed position of the supports 10 (cf. FIGS. 5A and 5B), and a lower position spaced apart from the upper position, located below said upper position to allow the removal of the molded container 2 (cf. FIG. 5C).

The molding unit 6 comprises, moreover, a device 16 for locking the mold 7 in the closed position, in order to allow said mold to tolerate blow-molding pressures without premature separation of the half-molds 9.

The locking device 16 comprises two locks 17, each cooperating with a half-mold support 10 and mobile between:

a locked position in which the locks 17 lock the half-mold supports 10 in the closed position (cf. FIGS. 2 and 5A), and a released position in which the locks 17 permit the passage of the half-mold supports 10 into the open position.

Figures 5A, 5B, 5C:
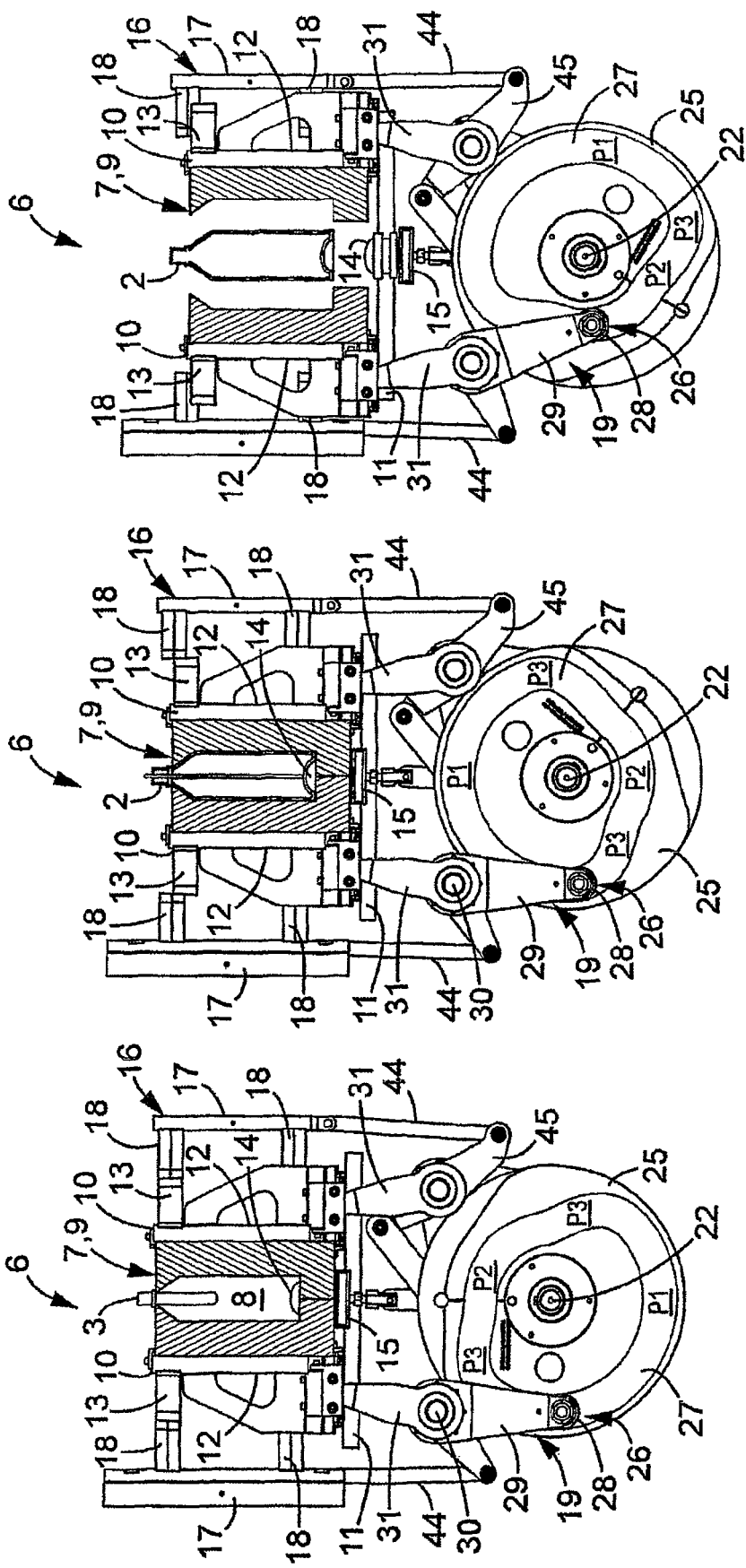
FIGS. 5A, 5B and 5C are front elevations (with the mold in section) showing the molding unit of FIGS. 2, 4A and 4B respectively in the same positions as in these figures.

As is illustrated in FIGS. 5A to 5C, the locks 17 are displaceable in vertical translation (parallel to the movement of the mold base support), the released position being located above the locked position. Each lock 17 is provided with a pair of superposed grooved transverse guides 18, of which the spacing is identical to that of the runners 13 of the corresponding support 10.

In the locked position, the runners 13 are in abutment against one end of the corresponding guides 18, their respective grooves being vertically offset, which prevents any movement to separate the supports 10. However, in the released position, the grooves of the runners 13 are located in alignment with the grooves of the corresponding guides 18, such that the supports 10 may freely slide, moving apart from one another, with the runners 13 sliding in their respective guides 18.

The sequence of movements of the half-mold supports 10, of the mold base support 15 and of the locks 17 is as follows.

Starting from a closed/locked configuration of the molding unit 6, in which the half-mold supports 10 are in the closed position, the locks 17 are in the locked position and the mold base support 15 is in the upper position (FIGS. 2, 5A, 6A, 7A), once the blow-molding cycle of the container 2 is completed, the locks 17 are displaced upward into the released position (FIGS. 4A, 5B, 6B, 7B). The configuration of the molding unit 6 is known as closed/unlocked. In this configuration, the half-mold supports 10 are maintained in the closed position and the mold base support 15 in the upper position. The molded container 2 is still located in the mold cavity 8.

Then the half-mold supports 10 are separated into the open position, while the mold base support 15 is displaced into its lower position. The molding unit 6 is thus in a configuration known as open/unlocked (FIGS. 4B, 5C, 6C, 7C). In this configuration the molded container 2 is removed, for example to a temporary storage or filling unit for the purpose of subsequent filling.

In order to permit its passage from one configuration to the other, the molding unit 6 comprises a plurality of transmissions, namely:

a primary transmission 19 to control the displacement of the half-mold supports 10, a secondary transmission 20 to control the displacement of the mold base support 15, and a tertiary transmission 21 to control the displacement of the locks 17.

These transmissions, which are mechanical, are all controlled simultaneously by a common transmission shaft 22, also known as a cam shaft, of which the rotation is ensured by an electric motor 23 controlled by a unit 24 for controlling the installation, a unit 24 which moreover ensures, in particular, the synchronization of the molding unit 6 and of the device for transferring the preforms 3.

The primary transmission 19 comprises a primary cam 25, mounted on the cam shaft 22, in addition to a primary cam follower 26 cooperating with the primary cam 25 and coupled to each half-mold support 10.

More specifically, according to a first embodiment (not shown), the primary cam and the primary cam follower are common to both half-mold supports, a set of levers alternately ensuring the separation and bringing together of the supports.

Nevertheless, according to a preferred embodiment, corresponding to the drawings, a pair of primary cams 25 and a pair of corresponding primary cam followers 26 are provided to control separately (albeit in a synchronized manner) the separation and, in a reciprocal manner, the bringing together of the supports 10. More specifically, such an assembly is preferable for overcoming—and at a high operational speed—the inertia of the half-mold supports 10 (with their corresponding half-molds 9).

The two primary cams 25 are mounted at two opposing ends of the cam shaft 22, each cam 25 being in the form of a disk in which a groove 27 with an asymmetric profile is created, forming a cam path of closed contour about the rotational axis of the shaft 22, whilst the corresponding primary cam follower 26 comprises a roller 28 freely pivotally mounted at the end of a lever 29 rigidly fixed at its opposing end to a secondary shaft 30 which is offset relative to the cam shaft 22 by a distance greater than the radius of the primary cam 25. Two connecting rods 31, also rigidly fixed to each of the ends of the secondary shaft 30, are connected to the corresponding half-mold support 10, to transform the rotational movement of the secondary shaft 30, due to the rocking motion of the lever 29 during the rotation of the cam 25, into a linear movement of the half-mold support 10.

As indicated above, each half-mold support 10 is driven in translation by its own set of cam/cam follower. From this point of view, the molding unit 6 has a planar symmetry relative to a transverse vertical plane, the two sets of primary cam 25/primary cam follower 26 being mounted inverted, and two secondary parallel shafts 30 being provided as is visible in FIG. 2 and in FIGS. 4A to 6B.

The secondary transmission 20 comprises a secondary cam 32, also mounted on the cam shaft 22, in addition to a secondary cam follower 33 cooperating with the secondary cam 32 and coupled to the mold base support 15.

More specifically, and as is visible in FIGS. 7A to 7C, the secondary cam 32 has a cam path 34 formed by its periphery of which the contour is asymmetrical, the secondary cam follower 33 comprising a roller 35 freely pivotally mounted on a lever 36, which is mounted freely in rotation on one of the secondary shafts 30 (for example by means of a sliding or rolling contact bearing), namely the lever 36 on which the mold base support 15 is mounted in articulation by means of a connecting rod 37. The weight of the mold base support 15 and of its connecting rod 37 may be sufficient to maintain the contact of the roller 35 on its cam path 33 but a return spring (not shown) may be provided for permanently urging the lever 36 in the direction of the cam 32.

As regards the tertiary transmission 21, this comprises, on the one hand, a tertiary cam 38 mounted on the cam shaft 22, resting against one of the primary cams 25 and, similar to said one of the primary cams, formed by a disk in which a groove 39 is made (clearly visible in FIGS. 7A to 7C) of asymmetrical profile forming a cam path of closed contour about the rotational axis of the cam shaft 22, and on the other hand, a tertiary cam follower 40 cooperating with the cam 38 and jointly coupled to the two locks 17.

In practice, the weight of the locks proves sufficiently low for the cam follower 40 alone to be able to control simultaneously the two locks (by means of a set of connecting rods).

Thus, as is shown in FIGS. 7A, 7B and 7C where the tertiary transmission 21 is clearly visible, the tertiary cam follower 40 comprises a roller 41, which cooperates with the cam path 39, freely pivotally mounted at one end of an angled lever 42, itself mounted freely in rotation on one of the secondary shafts 30. A crank 43, also mounted on said secondary shaft 30 and rigidly fixed to the angled lever 42, is connected moreover to one of the locks 17 by means of a connecting rod 44, to transform the rotational movement of the angled lever 42 into a translatory movement of the lock 17. A further lever 45, substantially symmetrically positioned, is moreover mounted freely in rotation at its center on the other secondary shaft 30. Said lever 45 is, at one first end, connected to the angle of the lever 42 by means of a connecting rod 46 and, at one opposing end, to the other lock 17 by means of a connecting rod 44, to transform the rotational movement of the angled lever 42 into a vertical translatory movement of the lock 17.

Referring to the profiles of the cams 25, 32, 38, the person skilled in the art is able to produce said profiles according to the dimensions of the molding unit 6 and the cycle adopted for the molding operations. More specifically, in this case, each cam path 27, 33, 39 has:

- a first portion P1 of large constant radius, which extends substantially over 180° and which corresponds:
  - for the primary cam 25, to the closed position of the corresponding half-mold support 10 (FIGS. 5A, 5B),
  - for the secondary cam 32, to the upper position of the mold base support 15,
  - for the tertiary cam 38, to the unlocked position of the locks 17 (FIGS. 6A, 6B),
- a second portion P2 of small constant radius, which extends substantially over 90° and which corresponds:
  - for the primary cam 25, to the open position of the corresponding half-mold support 10 (FIGS. 5A, 5B),
  - for the secondary cam 32, to the lower position of the mold base support 15,
  - for the tertiary cam 38, to the locked position of the locks 17 (FIGS. 6A, 6B),
- and two connecting portions P3 which carry out a continuous connection between the first portion P1 and the second P2.

From the design of the molding unit 6 which has been disclosed above, a considerable number of advantages result.

Firstly, the transmission of the "all mechanical" movement makes it possible to overcome maintenance and safety problems encountered in hydraulic systems using jacks (sealing faults may be cited, in particular, which may be repaired with difficulty and have consequences in terms of safety given significant oil pressures). The maintenance of the molding unit 6 is facilitated by the accessibility of the transmissions 19, 20, 21 grouped together about the same shaft 22 arranged under the mold 7. The cams 25, 32, 38, in the same manner as the levers and connecting rods 29, 31, 36, 37, 42, 43, 44, 45, 46, may be easily dismantled and replaced (even repaired) in situ.

Regarding the drive, a single electric motor 23 is sufficient for the operation of the molding unit 6, said motor 23 driving the cam shaft 22, with distribution to the half-mold supports 10, mold base support 15 and locks 17 without it being necessary to have recourse to auxiliary motors, for simplicity of operation (no synchronization of motors or jacks being necessary) and maintenance. Said single motor 23, designed for displacing the heaviest parts (in this case the half-mold supports 10 and their respective half-molds 9), is naturally suitable for the least heavy parts (the mold base support 15 and the locks 17) so that only one size of motor is necessary, to simplify the design.

Moreover, the grouping together of the transmissions 19, 20, 21 about the same transmission shaft 22 and the mounting of the cams 25, 32, 38 on this shaft 22 make it possible to avoid accumulating mounting tolerances required in complex machines where the mobile parts are mounted in cascade, such tolerances producing operational clearances. Such operational clearances are minimized in this case.

The invention claimed is:

1. A molding unit for an installation for blow-molding or stretch-blow-molding containers from blanks made of thermoplastic material, said molding unit comprising:
    a pair of half-molds, each half-mold being provided with at least one mold half-cavity, respectively mounted on two supports which are mobile in horizontal translation in a transverse direction perpendicular to a longitudinal direction for supplying said blanks, between a closed position in which said supports are brought together and where said half-cavities jointly form a lateral wall of a mold cavity and an open position in which said supports are separated from one another;
    a primary transmission controlling displacement of said half-mold supports;
    a mold base mounted on a support which is mobile in vertical translation in a direction perpendicular to said longitudinal and transverse directions, between an upper position in which an upper surface of said mold base completes said mold cavity in said closed position of said supports and a lower position spaced apart from said upper position, below said upper position;
    a secondary transmission controlling displacement of said mold base support;
    a locking device which comprises two locks, each cooperating with a respective half-mold support, mobile in translation between a locked position in which said locks lock said half-mold supports in said closed position, and a released position in which said locks permit the passage of said half-mold supports into said open position; and
    a tertiary transmission controlling displacement of said locks,
    wherein
        said primary transmission comprises a primary cam mounted on a rotating shaft driven by a motor, in addition to a primary cam follower cooperating with said primary cam and coupled to each said half-mold support;
        said secondary transmission comprises a secondary cam mounted on said rotating shaft, in addition to a secondary cam follower cooperating with said secondary cam and coupled to said mold base support; and
        said tertiary transmission comprises a tertiary cam mounted on said rotating shaft, in addition to a tertiary cam follower cooperating with said tertiary cam and coupled to each said lock.

2. The molding unit as claimed in claim 1, wherein said primary cam is in the form of a disk mounted on said rotating shaft and in which a first cam path is formed, said primary cam follower comprises a first roller which cooperates with said corresponding first cam path and in that said first roller is mounted on a first lever mounted in rotation on a secondary shaft parallel to said rotating shaft, said first lever being coupled to at least one said half-mold support by means of at least one first connecting rod rigidly mounted on said secondary shaft.

3. The molding unit as claimed in claim 1, wherein said primary cam follower is common to said two half-mold supports.

4. The molding unit as claimed in claim 1, wherein said primary transmission comprises two primary cams mounted on said rotating shaft in addition to two primary cam followers respectively cooperating with said primary cams and coupled respectively to said two half-mold supports.

5. The molding unit as claimed in claim 1 wherein said secondary cam has a second cam path formed by a periphery of asymmetrical contour of said secondary cam, said secondary cam follower comprises a second roller mounted on a second lever, mounted freely in rotation on a secondary shaft and connected to said mold base support by means of a second connecting rod.

6. The molding unit as claimed in claim 1, wherein said tertiary cam comprises a disk mounted on said transmission shaft and in which a third cam path is formed, said tertiary cam follower comprises a third roller which cooperates with said corresponding third cam path and said third roller is mounted on a third lever mounted in rotation on a secondary shaft parallel to said rotating shaft, said third lever being coupled to said locks by means of a connecting rod and lever set.

7. The molding unit as claimed in claim 1, wherein said locks are provided with grooved guides, said half-mold supports are provided with grooved runners of complementary shape to said guides and which, in said locked position, are in abutment against said guides and in the release position cooperate slidably with said guides.

8. An installation for manufacturing containers by blow-molding or stretch-blow-molding which comprises a molding unit as claimed in claim 1.

* * * * *